July 15, 1958  J. K. POLHEMUS  2,843,031
VIEWING HOOD AND COVER FOR PHOTOGRAPHIC CAMERA
Filed March 16, 1954

INVENTOR.
JOHN K. POLHEMUS
BY

United States Patent Office 2,843,031
Patented July 15, 1958

2,843,031

VIEWING HOOD AND COVER FOR PHOTOGRAPHIC CAMERA

John K. Polhemus, Binghamton, N. Y., assignor to General Aniline & Film Corporation, New York, N. Y., a corporation of Delaware Application March 16, 1954, Serial No. 416,570

8 Claims. (Cl. 95—47)

The present invention relates generally to a camera of the reflex type in which the image to appear on the finished print can be seen by the operator on the ground glass view finder. More specifically, the invention relates to a combined cover means which serves as a lens hood for viewing the reflex finder image and also serves as a protective cover for the finder and objective lenses.

The reflex type of camera to which the present invention is applicable is of conventional design and is known as the twin lens reflex type. One of the lenses constitutes an objective lens for projecting the image upon the film within the camera, and the second lens is an independent finder lens for projecting substantially the same image onto a reflex viewing optical surface which may be a field lens or a ground glass plate. The ground glass plate or the field lens upon which the image appears is generally disposed at the top of the camera and the operator views the image by looking down at the camera.

In order to properly view the image formed upon the ground glass plate, it is necessary to shield said plate from extraneous light. It is customary to provide a hood surrounding said ground glass plate to permit the operator of the camera to see a clear image thereupon when he looks down into the camera.

The primary object of the present invention is to provide a novel viewing hood arrangement formed of three panels so arranged that when in raised position, the three panels cooperate to form a viewing hood, and when in collapsed position, two of the panels form a closure for the ground glass plate and the third panel forms a protective cover for both the finder and objective lenses.

The invention will be described in greater detail by reference to the accompanying drawing, in which:

Fig. 3 is an enlarged detail view of the sliding closure mounting;

Figure 1:
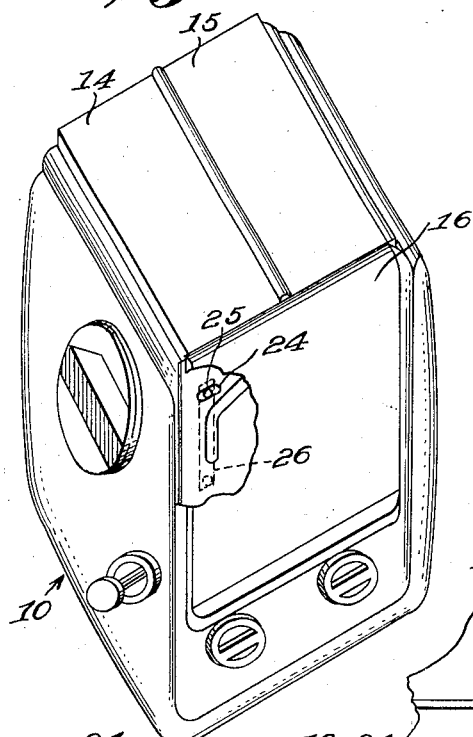
Fig. 1 is a front perspective view of a camera showing the viewing hood and lens cover in the closed position.

Referring to the drawing in detail, the camera, indicated by numeral 10, may be of any conventional design but must be of the reflex type. It can be a single lens or a twin lens reflex camera and the latter type is chosen by way of example to illustrate the invention. As shown in the drawing, the camera is of rectangular shape and includes the usual objective lens 11, the finder lens 12 and the ground glass plate 13. The light rays reflected from the objective to be photographed enter the camera 10 through the viewer objective lens 12 and impinge upon an inclined mirror (not shown). The rays are reflected by this mirror onto the ground glass plate 13 to form an image of the object at which the camera is pointing.

In order to properly view the image formed upon the ground glass plate, it is necessary to partially shield said plate from outside light. It is customary to provide a hood surrounding said ground glass to permit the operator of the camera to see a clear image thereupon when he looks down into the camera. A novel collapsible hood for this purpose has been provided which is simple in construction and efficient in operation. Said hood is shown in Fig. 1 in closed position or may be open for use as shown in Fig. 2.

The hood consists of two hinged closure plates 14, 15 and a sliding plate 16. The two side walls of the camera body are suitably grooved at 17 to slidably receive the flanges 18 of a cam plate 19 rigidly secured to the rear of the sliding plate 16. The cam plate 19 is provided with a pair of cam slots 20, 21 which receive studs 22, 23 mounted at the forward, outer ends of closure plates 14 and 15. The studs 22 and 23 engage their respective slots in such manner as to cause both closure plates to automatically and simultaneously close when sliding plate is pushed down or to open when the sliding plate is raised.

Figure 2:
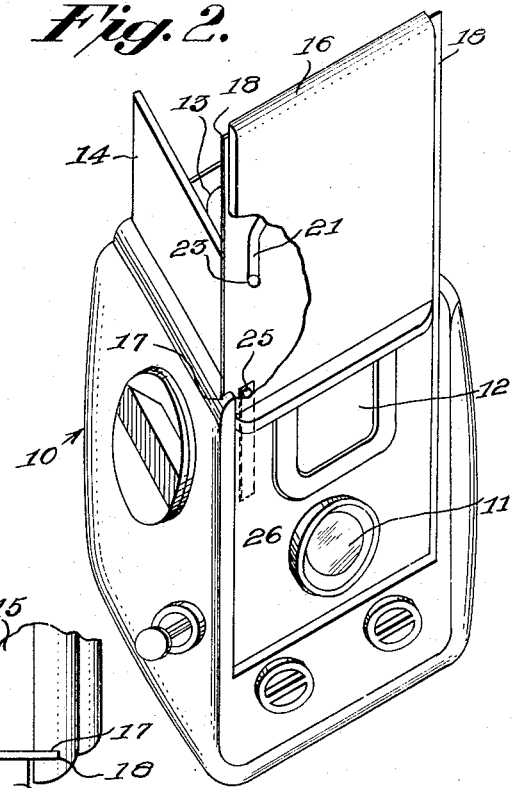
Fig. 2 is a similar view showing the lenses uncovered and the viewing hood in operative position.
Figure 4:
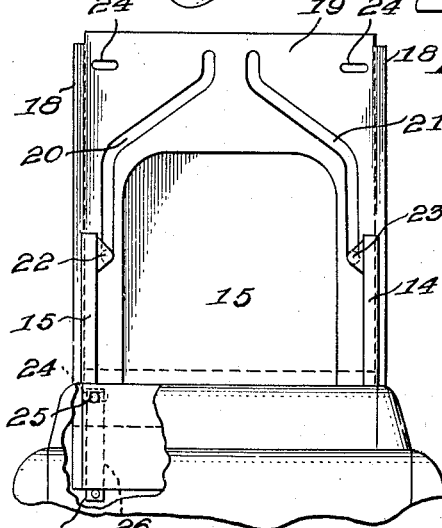
Fig. 4 is a partial rear view of the camera with the hood in operative position.

Referring to Figs. 1 and 4, there is shown one specific method of holding the closure plates and sliding plate in either raised or lowered positions. Four detent slots 24, two on either side of cam plate 19, cooperate with a detent 25 carried by a detent spring 26 which in turn is secured to the body of the camera. The four detent slots are located in such position with respect to sliding plate 16, so that two lower slots, one on each side cooperatively engage with detent 25 in the raised or open position of sliding plate 16, and the two upper detent slots engage the detent 25 in the lower or closed position of the sliding plate 16.

Figure 5:
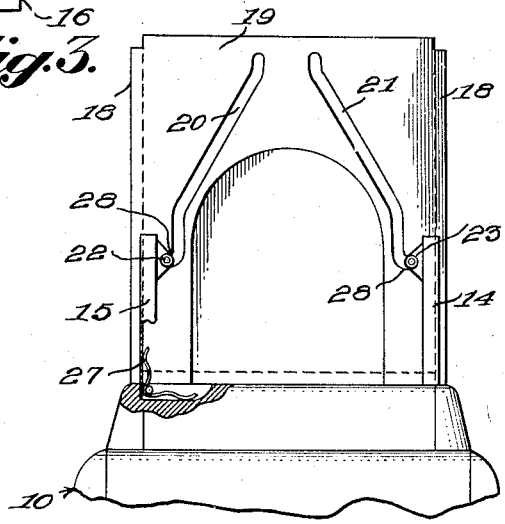
Fig. 5 is a similar view of a slightly modified form of construction.

Fig. 5 shows an alternative method of holding the sliding plate 16 and cover plates 14 and 15 in position. A pair of hinge torsion springs 27 exert opening forces on the two closure plates 14, 15 and cause the two studs 22, 23 to engage in outwardly extending notches 28 formed in the cam slots 20 and 21 and thus hold the closure plates and sliding plates in the up or raised position. The plates 16 may be lowered by simply moving the closure plates toward each other and then pushing the sliding plate downward to its closed position.

The mode of operation is clearly apparent from the foregoing description. It will be seen that in addition to providing a collapsible hood structure, one of the elements forming the hood will serve, when the hood is in closed position, to protect the lenses of the camera from dust, accidental scratches or from being finger marked.

While two embodiments of the invention have been disclosed, it is to be understood that the inventive concept may be carried out in a number of ways. This application is, therefore, not to be limited to the precise details described but is intended to cover all variations and modifications thereof falling within the spirit of the inventive and the scope of the claims.

I claim:

1. In a camera having an objective lens and a ground glass plate, a pair of hinged closure plates for said ground glass plate, a plate slidably mounted in the camera and adapted to cover the objective lens when in lowered position, means on the sliding plate coacting with means on the closure plates to open the closure plates upon raising of the sliding plate thereby forming a hood for the ground glass plate, and means for releasably retaining the plates in raised position, said means comprising springs urging said closure plates into open position.

2. In a camera having an objective lens and a ground glass plate, a pair of hinged closure plates for said ground glass plate, a plate slidably mounted in the camera and adapted to cover the objective lens when in lowered position, cam slots on the rear of the sliding plate, and studs on the closure plates received in said slots whereby raising of the sliding plate will raise the closure plates to open position.

3. In a camera having an objective lens and a ground glass plate, a pair of hinged closure plates for said ground glass plate, a plate slidably mounted in the camera and adapted to cover the objective lens when in lowered position, cam slots on the rear of the sliding plate, studs on the closure plates received in said slots whereby raising of the sliding plate will raise the closure plates to open position, and means for releasably retaining the plates in raised or lowered position.

4. In a camera having an objective lens and a ground glass plate, a pair of hinged closure plates for said ground glass plate, a plate slidably mounted in the camera and adapted to cover the objective lens when in lowered position, cam slots on the rear of the sliding plate, studs on the closure plates received in said slots whereby raising of the sliding plate will raise the closure plates to open position, and means for releasably retaining the plates in raised or lowered position, said means comprising upper and lower detent slots on the rear of the sliding plate and spring detents mounted on the camera body.

5. In a camera having an objective lens and a ground glass plate, a pair of hinged closure plates for said ground glass plate, a plate slidably mounted in the camera and adapted to cover the objective lens when in lowered position, cam slots on the rear of the sliding plate, studs on the closure plates received in said slots whereby raising of the sliding plate will raise the closure plates to open position, and means for releasably retaining the plates in raised position, said means comprising springs urging said closure plates into open position.

6. In a reflex camera having an objective lens and a reflex viewing optical surface, a pair of hinged closure plates covering said surface when in closed position and a slidably movable front plate adapted to cover the objective lens when in downward position and uncover said lens when moved upwardly, coupling means interconnecting said closure plates and said front plate for erecting said closure plates upon upward movement of said front plate, said closure plates and said front plate forming thereby a hood partially surrounding said viewing surface.

7. In a reflex camera having an objective lens and a reflex viewing optical surface, a pair of hinged closure plates covering said surface when in closed position and a slidably movable front plate adapted to cover the objective lens when in downward position and uncover said lens when moved upwardly, coupling means interconnecting said closure plates and said front plate for erecting said closure plates upon upward movement of said front plate, said cover plates and said front plate forming thereby a hood partially surrounding said viewing surface and locking means for releasably retaining said plates in upward position.

8. In a reflex camera having an objective lens and a reflex viewing optical surface, a pair of laterally hinged plates covering said surface when in closed position and a slidably movable front plate adapted to cover the objective lens when in downward position and uncover said lens when moved upwardly, coupling means interconnecting said closure plates and said front plate for erecting said closure plates upon upward movement of said front plate, said closure plates forming thereby the sides of a substantially rectangular enclosure surrounding said viewing surface and said front plate forming the front of said enclosure.

References Cited in the file of this patent

UNITED STATES PATENTS

| 2,495,355 | Stahl | Jan. 24, 1950 |
| 2,634,661 | Roth | Apr. 14, 1953 |

FOREIGN PATENTS

| 234,823 | Great Britain | Dec. 17, 1925 |
| 526,340 | Germany | Jan. 14, 1930 |